United States Patent [19]
Olevsky et al.

[11] 3,959,601
[45] May 25, 1976

[54] VARIABLE RATE CLOCK SIGNAL RECOVERY CIRCUIT

[75] Inventors: Benjamin Olevsky, Andalusia; Jay W. Layer, Chester, both of Pa.; Keith L. Zerschling

[73] Assignee: Ford Motor Company, Dearborn, Mich.

[22] Filed: June 27, 1975

[21] Appl. No.: 591,225

[52] U.S. Cl. ............................ 178/69.5 R; 178/88; 325/433
[51] Int. Cl.² ........................................... H04L 7/00
[58] Field of Search ............... 325/433; 328/63, 72; 178/88, 69.5 R

[56] References Cited
UNITED STATES PATENTS
3,238,462  3/1966  Ballard .................................. 328/63

*Primary Examiner*—Harold I. Pitts
*Attorney, Agent, or Firm*—Robert W. Brown

[57] ABSTRACT

A circuit for use in a digital data receiver to recover a clock signal, of variable rate, from the signal received by the receiver. A typical digital data receiver includes demodulating or other means for converting the received signal to a binary data signal having a characteristic which changes in a manner corresponding to transition in the digital data received. The invention provides circuit means for recovering a clock signal from the binary data signal where the data rate may vary over a substantial range. The clock signal recovery circuit utilizes a logic transition detector to produce a narrow pulse at each data transition in the binary data signal. The pulses, which contain harmonic frequencies at the clock rate of the binary data signal, are up-converted or mixed with an electrical signal from a frequency synthesizer. The signal resulting from this up-conversion is filtered by a narrow-band filter to produce an electrical signal at a predetermined intermediate frequency. The output signal from the frequency synthesizer is mixed with the signal from the narrow-band filter, in a down-converter circuit, to produce a reference signal having a frequency proportional to the clock frequency of the binary data signal. The frequency synthesizer has a variable frequency output determined by the setting of a data rate selector. An electronically controlled oscillator produces a signal having a frequency proportional to the binary-data-signal clock rate. The oscillator is in a phase-lock loop including a phase detector supplied with the reference signal having a frequency proportional to the clock rate of the binary data signal.

10 Claims, 7 Drawing Figures

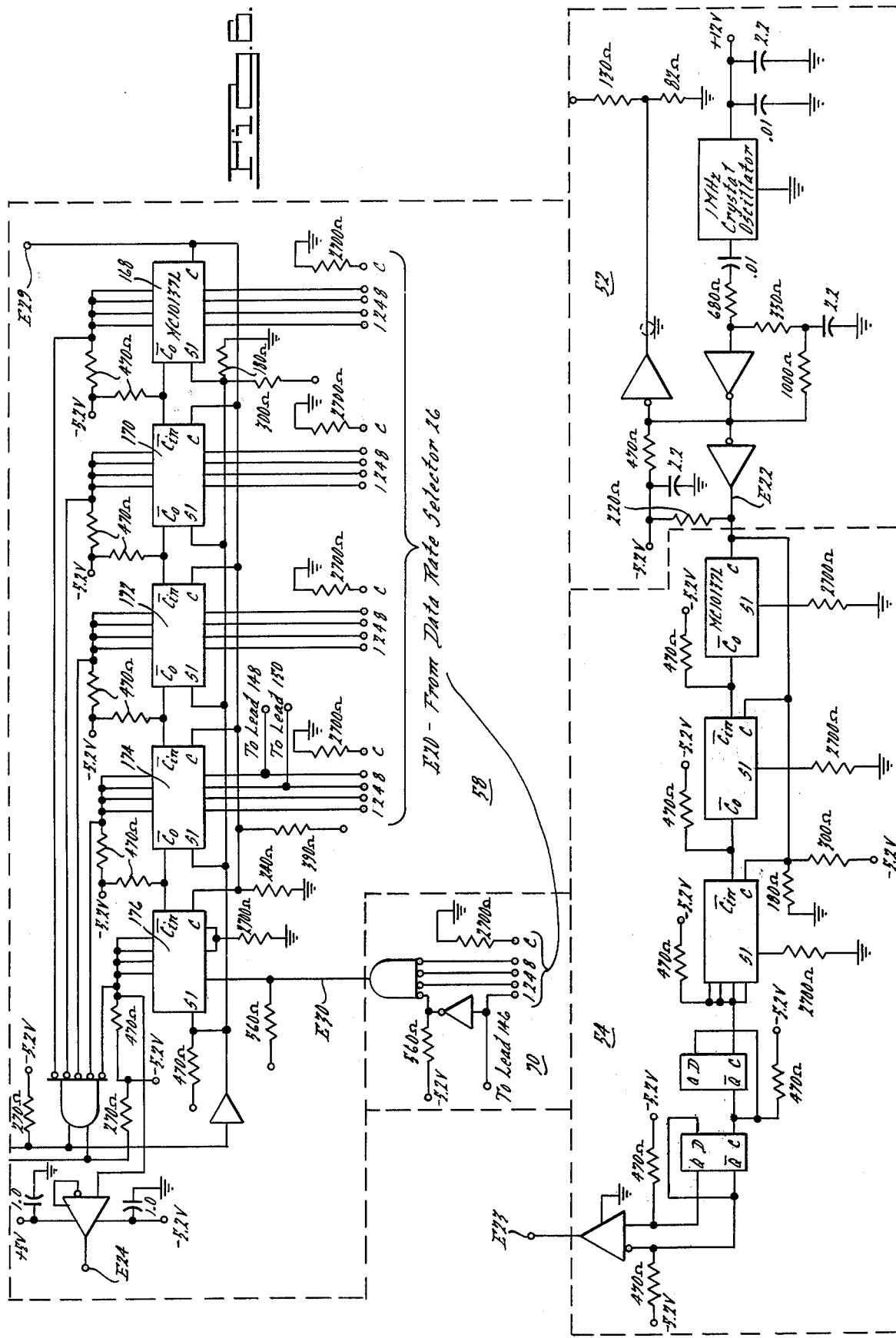

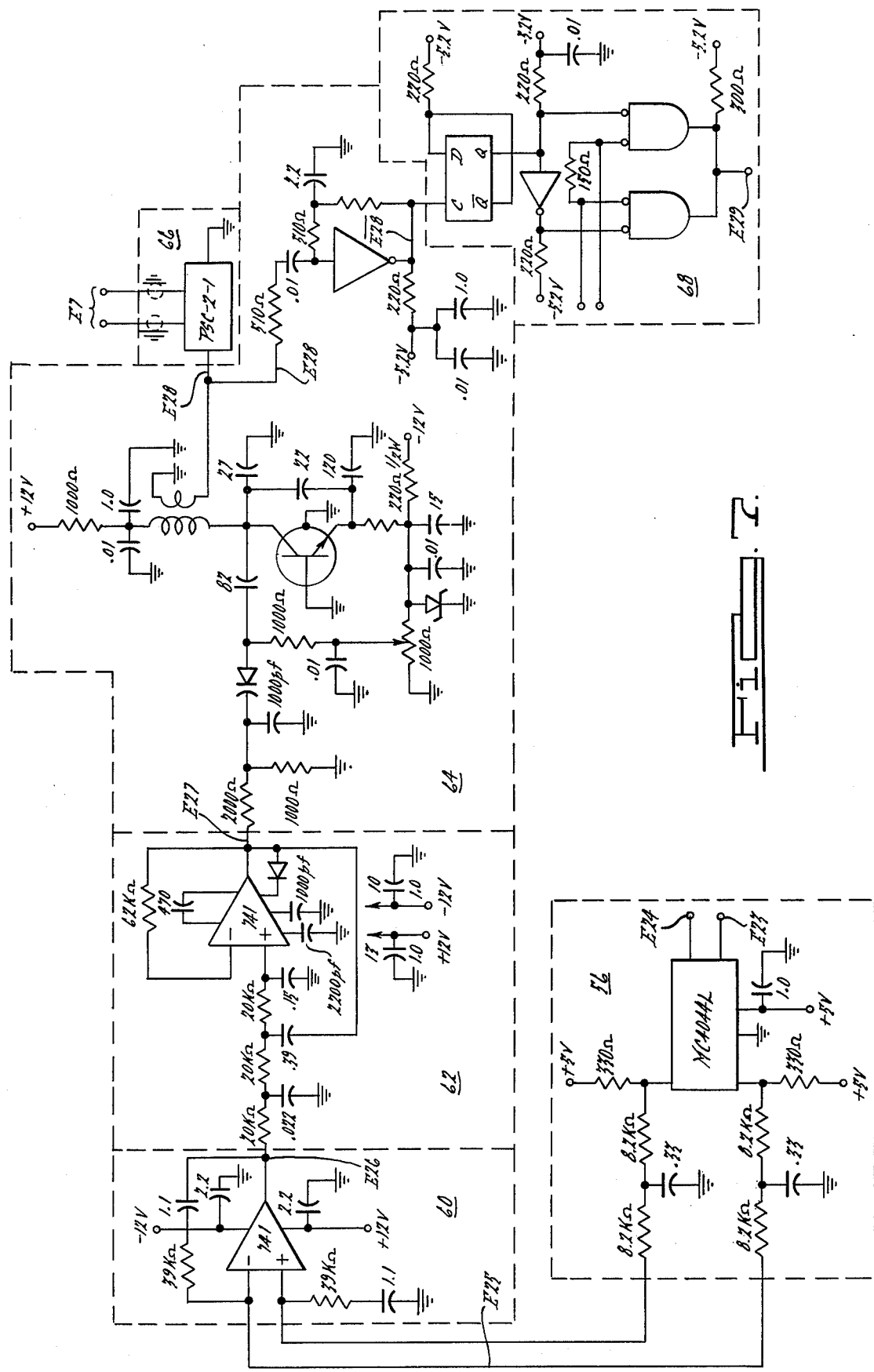

VARIABLE RATE CLOCK SIGNAL RECOVERY CIRCUIT

BACKGROUND

The invention herein described was made in the course of or under a contract or subcontract thereunder, (or grant) with the Department of the Air Force.

This invention relates to a circuit for a digital data receiver for use in recovering a clock signal which may be of variable rate. Prior art U.S. patents of interest include U.S. Pat. No. 3,238,462 to Ballard et al, U.S. Pat. No. 3,142,802 to Maure, U.S. Pat. No. 3,731,220 to Besenfelder and U.S. Pat. No. 3,798,573 to Seidel.

Most digital transmission systems operate at a single clock rate or at a limited number of standard clock rates due to the difficulty of recovering from the received signal a clock signal that varies over a wide band of frequencies. In such limited clock-rate digital communications systems, clock recovery in the receiver is accomplished with the use of tracking filters, pilot tones, etc. In fixed-rate clock recovery systems, the demodulated data is reshaped to obtain a spectral line at the clock rate. The reshaped signal is band-pass filtered to improve the signal-to-noise ratio and conducted through a tracking filter or phase-lock loop to further enhance the signal-to-noise ratio.

In a digital data receiver intended to receive binary data having an associated clock rate that may vary over a wide band of frequencies, with end points of the band forming a ratio of 8 to 1 or greater, the use of the conventional clock recovery technique described in the preceding paragraph would entail the use of a multitude of filters and electronically controlled oscillators, an impractical requirement.

SUMMARY OF THE INVENTION

The term "digital data receiver" as used herein refers to a device capable of receiving and processing a transmitted electrical signal containing digital information to produce useful intelligence. Generally, the transmission medium is immaterial and may utilize electromagnetic carrier waves, magnetic tape or the like, Devices of this type for receiving and processing digital information signals require a timing waveform which is synchronized with the received data signal in order to permit processing, decoding and time requantization of the received digital data. The variable-rate clock-signal recovery circuit of the invention permits digital receiver systems readily to accommodate binary data signals based on clock frequencies that may vary over an extremely broad band without modification or restructuring of the receiver equipment.

A digital data receiver typically includes means for generating a binary data signal having a characteristic which changes in a manner corresponding to transitions in the digital data received by the receiver. The characteristic of the binary data signal which changes according to data transitions usually is a voltage the level of which shifts at each transition of the data from a logic zero level to a logic one level of vice versa.

In accordance with the invention, a variable-rate clock-signal recovery circuit comprises first circuit means, supplied with the binary data signal generated in the digital data receiver, for generating a first electrical signal comprising a series of pulses, each of the pulses corresponding to a transition in the digital data received by the receiver. Second circuit means are provided for generating a second electrical signal with predetermined or selectable frequency. The frequency of the second electrical signal is determined by the clock rate of the received digital data. Third circuit means, supplied with the first and second electrical signals, are utilized for mixing the first and second electrical signals and up-converting the first electrical signal to produce a third electrical signal having sideband or spectral components differing in frequency from the second electrical signal by the spectral content of the frist electrical signal.

Fourth circuit means are provided for producing a fourth electrical signal of predetermined intermediate frequency, the fourth circuit means comprising a narrow band filter for the third electrical signal. In effect, this permits the selection of a sideband component of the third electrical signal which sideband component corresponds to a fundamental or harmonic component of the pulses which comprise the first electrical signal.

Fifth circuit means are supplied with the second electrical signal and with the fourth electrical signal or a signal derived therefrom for the purpose of mixing or down-converting the fourth electrical signal or signal derived therefrom to produce a fifth electrical signal having a frequency corresponding to the difference in frequencies of the second and fourth electrical signals and proportional to the clock rate of the binary data signal.

Preferably, the variable-rate clock-signal recovery circuit includes an electronically-controlled oscillator having a frequency range which may be narrower than the band of clock signal frequencies over which the digital data receiver is operable. When the electronically-controlled oscillator frequency range extends to the upper limit of the range of clock signals for the received digital data, then frequency divider networks may be utilized to produce oscillator-controlled frequencies corresponding to the clock frequencies for the lowest digital data rates.

preferably, the second electrical signal having a predetermined or selectable frequency is in fact selectable in frequency and produced by a frequency synthesizer controlled by a data rate selector. The data rate selector may be used to control the division of the electronically-controlled-oscillator output signal, may be used to control the frequency selected from the frequency synthesizer and may be used to vary the gain of a a phase-lock loop. The phase-lock loop may utilize a phase detector for comparing the frequency of an elcctrical signal proportional to the electronically-controlled-oscillator output frequency with the frequency of the fifth electrical signal derived from the binary data signal.

The invention may be better understood by reference to the detailed description which follows and to the drawings.

BRIEF DESCRIPTION OF THE DRAWINGS

FIG. 4 is a detailed schematic electrical diagram of circuits 22, 42, 56, 48 and 28 shown in block form in

FIG. 1;

FIG. 6 is a detailed schematic electrical diagram of circuits 52, 54, 58 and 70 shown in block form in FIG. 2; and FIG. 7 is a detailed schematic electrical diagram of circuits 56, 60, 62, 64, 66 and 68 shown in block form in FIG. 2.

Figure 1:
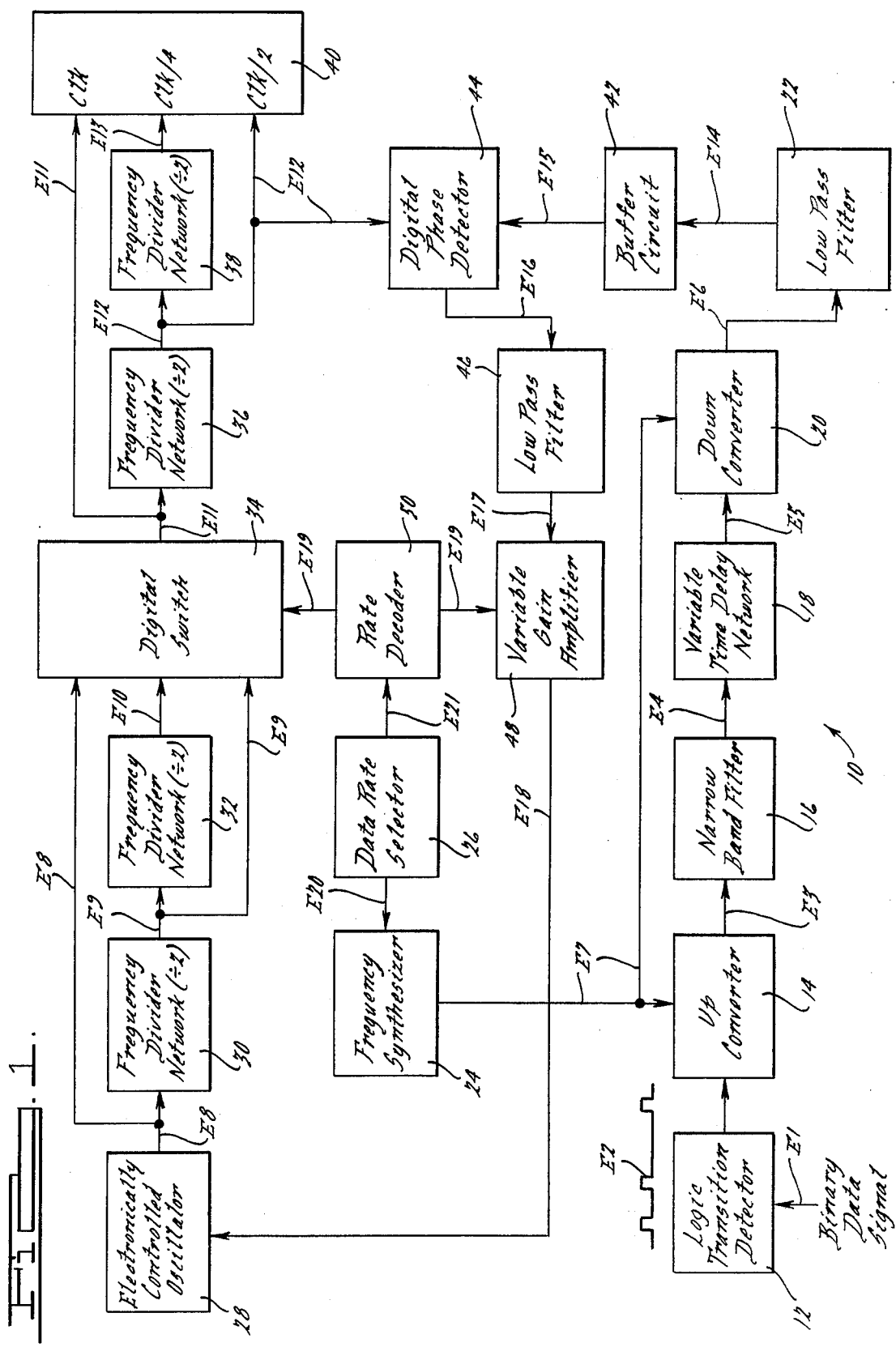
FIG. 1 is a block diagram of a variable-rate clock-signal recovery circuit for a digital data receiver.

The drawings illustrate a preferred embodiment of the invention and the detailed schematic diagrams of FIGS. 3 through 7, and the component type numbers or values, are exemplary and not limitative. Unless otherwise indicated, capacitor values are in microfarads and inductor values are in microhenrys. Circuit components having type numbers beginning with the letters MC are commercially available components manufactured by Motorola. Further, electrical signals in the drawings are designated by the letter E followed by a numeral, together with indication of the circuit points at which the electrical signals occur.

DETAILED DESCRIPTION

With reference now to the drawings, wherein like numerals or designations refer to like electrical signals or elements in the several views, there is shown in FIG. 1 a schematic electrical block diagram of a clock-signal recovery circuit for a digital data receiver designed to receive digital data based on a variable clock rate. As described herein, the circuitry in the drawings is designed for utilization with transmitted digital data having a data rate in the range from 1.536 to 12.950 megabits per second (MBPS). Also, the clock-signal recovery circuit illustrated in the drawings is designed for use with a digital data receiver and transmitter employing binary 4-level encoding wherein two bits of binary data information are required for decoding of the transmitted information.

The clock-signal recovery circuit is generally designated by the numeral 10. The circuit 10 includes a logic transition detector 12 having a binary data signal El as an input. The binary data signal may be derived from a digital data receiver demodulator section and typically consists of an electrical signal of varying amplitude obtained by demodulation of a phase modulated carrier signal or the like, but in any event containing amplitude variations corresponding to transitions in the digital data received. The logic transistion detector utilizes the binary data signal El to produce a signal E2 comprising a series of pulses, each of the pulses corresponding to a transition in the digital data received. Where the digital data received consists of a series of logic zeros or ones, no transition may take place and a pulse may be absent as illustrated by the waveform E2. Preferably, the logic transition detector is utilized to provide pulses in the waveform E2 of low duty cycle to insure that the signal E2 has a spectral content of substantial energy level at the clock frequency corresponding to the data rate of the binary data signal El.

The electrical signal E2 is supplied to an up-convertor or mixer 14 which mixes the signal E2 with a signal E7 from a frequency synthesizer 24. If the data rate of the binary data signal E1 were fixed, then the electrical signal E7 could be of predetermined or fixed frequency. However, where the binary data signal may be of variable data rate, the frequency synthesizer produces an output electrical signal E7 of selectable frequency level controlled by an electrical signal E20 preferably obtained from a data rate selector 26. Preferably the data rate selector 26 is a commercially available device comprising five dials, each dial having 10 positions corresponding to the decimal digits 0 through 9, each of the dials producing a binary-coded-decimal signal of four bits corresponding to the dial selection position. The frequency synthesizer 24 produces a signal E7 having a frequency that is determined by the positioning of the dials in the data rate selector 26. Of course, the setting of the data rate selector and the frequency of the electrical signal E7 is determined by the data rate of the binary data signal E1. Each of the dials of the data rate selector represents a digit of a five-digit decimal number corresponding to a frequency. If the least significant digit of the decimal number represents thousands of Hz, then a change of one unit in the least significant digit represented by the dials corresponds to a change of 1,000 Hz in the frequency of the electrical signal E7 and in the clock rate of the binary data signal E1. Preferably, the electrical signal E7 produced by the frequency synthesizer 24 has a frequency equal to 30 MHz plus one-half the clock frequency corresponding to the data rate of the binary data signal E1. The remaining discussion assumes that the electrical E7 has this frequency relationship with the clock rate of the binary data signal.

For digital data having a rate from 1.536 to 12.950 MBPS, the corresponding clock rate has a frequency range from 1.536 to 12.950 MHz. In such case, the frequency of the electrical signal E7 supplied to the up-convertor 14 varies over the frequency range from 30.768 MHz to 36.475 MHz. Mixing of the electrical signals E2 and E7 produces the electrical signal E3 at the output of the up-converter 14. The signal E3 is a sinusoidal signal at the frequency of the electrical signal E7, but includes plus sideband components determined by the spectral content of the electrical signal E2.

The electrical signal E3 is supplied to a narrow-band filter 16 having an output electrical signal E4 at 30 MHz, a frequency which corresponds to one of the spectral lines in the electrical signal E3. This spectral line corresponds to the difference between the frequencies of the electrical signals E7 and E2, the latter signal including a spectral component having a frequency at one-half the clock frequency. The narrow-band filter 16 preferably has an extremely narrow bandwidth of, for example, 13 KHz which serves to reject all of the side band components generated in the up-converter circuit 14, except the desired 30 MHz component.

It should be noted that only one narrow-band filter 16 is utilized for all of the various clock frequencies corresponding to the various data rates of the binary data signal E1.

The output electrical signal E4 from the narrow band filter at 30 MHz is supplied to a variable time delay network 18. This network 18 delays the electrical signal E4 by a predetermined number of nanoseconds to provide an electrical signal E5 corresponding in frequency to the electrical signal E4 but delayed to permit the clock signal derived by the circuit 10 to fall at or near the center of the bit-interval of the received digital data signal.

The delayed electrical signal E5 is supplied to a down-convertor or mixer 20 that also is supplied with the electrical signal E7 having a frequency at 30 MHz plus one-half the clock frequency. The down-converter 20 mixes the electrical signals E5 and E7 to produce an electrical signal E6 including the sum and difference frequencies of the input signals E5 and E7. A low-pass filter 22 permits the difference frequency E14, which has a frequency equal to one-half the clock rate, to pass through it.

If only a signal at one-half the clock rate were required in the processing of the binary data signal, the electrical signal E14 could be utilized directly. However, a timing signal which varies at the clock rate is generally required by the digital data receiver processing circuits. This requirement is satisfied by a phase-lock loop configuration.

The electrical signal E14 is supplied to a buffer circuit 42 having an output electrical signal E15 that is supplied to a digital phase detector 44. The digital phase detector 44 is part of a phase-lock loop which includes an electronically-controlled oscillator 28. The digital phase detector 44 is supplied with an electrical signal E12 having a frequency proportional to the frequency of the output electrical signal E8 from the electronically-controlled oscillator. Any phase difference between the electrical signals E12 and E15 results in the generation of an error electrical signal E16 having a voltage magnitude determined by the phase difference between the signals E12 and E15. The electrical signal E16 passes through a low-pass filter 46 to remove any high-frequency components that may be present, and the resulting electrical signal E17 forms the input to a variable-gain amplifier 48. The output of the variable-gain amplifier is an electrical signal E18 that is supplied to the electronically-controlled oscillator 28 and which has a voltage magnitude that determines the frequency of the oscillator output electrical signal E8.

The electrical signal E8 is applied to divide-by-two frequency divider networks 30 and 32 to produce an electrical signal E9 at one-half of the frequency of the electrical signal E8 and an electrical signal E10 at one-fourth the frequency of the electrical signal E8.

A digital switch 34 has an output lead on which a signal E11 appears and has three input terminals to which the electrical signals E8, E9 and E10 are applied, respectively. The function of the digital switch is to connect the output terminal on which the signal E11 appears with any one of the three input terminals on which the signals E8, E9 and E10 appear. Which of the input terminals is connected to the output terminal of the digital switch 34 is determined by an electrical signal E19 which controls the digital switch 34. In any event, the electrical signal E11 corresponds to one of the three input signals to the digital switch 34.

Preferably, the electronically controlled oscillator 28 has a frequency range from 6.144 MHz to 15.996 MHz. In contrast to this, the clock-signal recovery circuit 10 is useful for data rates corresponding to clock-signal frequencies from 1.536 MHz to 12.950 MHz. The electrical signal E8, as previously stated, is the output of the electronically-controlled oscillator 28 and has a frequency range from 6.144 MHz to 15.996 MHz. The frequency divider network 30 divides the frequency of the electrical signal E8 by two to produce the electrical signal E9 having a frequency range from 3.072 MHz to 7.998 MHz. Similarly, the frequency divider network 32 divides the frequency of the electrical signal E9 by two to produce the electrical signal E10 having a frequency range from 1.536 MHz to 3.999 MHz.

The digital switch 34 is controlled by a rate decoder 50 which, in turn, is controlled by an electrical signal E21 from the data rate selector 26. The rate decoder 50, in effect, divides the data rate range of the data rate selector 26 into three frequency bands and sets the digital switch 34 accordingly to produce the electrical signal E11 corresponding to one of the input electrical signals E8, E9 or E10. In the low data-rate range, the electrical signal E11 corresponds to the signal E10 and has a frequency range from 1.536 MHz to 3.999 MHz. In the mid data rate range, the electrical signal E11 corresponds to the signal E9 and has a frequency range from 4.000 MHz to 7.999 MHz. In this mid data-rate range, only the 8.000 MHz to 15.996 MHz range of the electronically-controlled oscillator 28 is used, this also being the case in the high data-rate range. In the high data-rate range, the electrical signal E11 corresponds to the signal E8 and has a frequency range from 8.000 MHz to 12.950 MHz.

The electrical signal E11 is a clock rate corresponding to the data rate of the binary data input signal E11. The signal E11 is divided in frequency by a frequency divider network 36. As shown, the network 36 provides a frequency division by two, but, in general, the frequency divider network 36 is a divide by N circuit where N equals $\log_2 L$ where L designates the level of encoding in the digital communication system. For four level encoding, N equals 2 as indicated. The output signal from the frequency divider network 36 is an electrical signal E12 at one-half the clock frequency. This signal E12 is applied to the digital phase detector 44 as previously described. A frequency divider network 38 is provided to divide the electrical signal E12 frequency by two to produce an electrical signal E13 having a frequency at the clock rate divided by four. The signals E11, E12 and E13 are applied to a buffer circuit 40 as the output of the clock signal recovery circuit 10.

Figure 2:
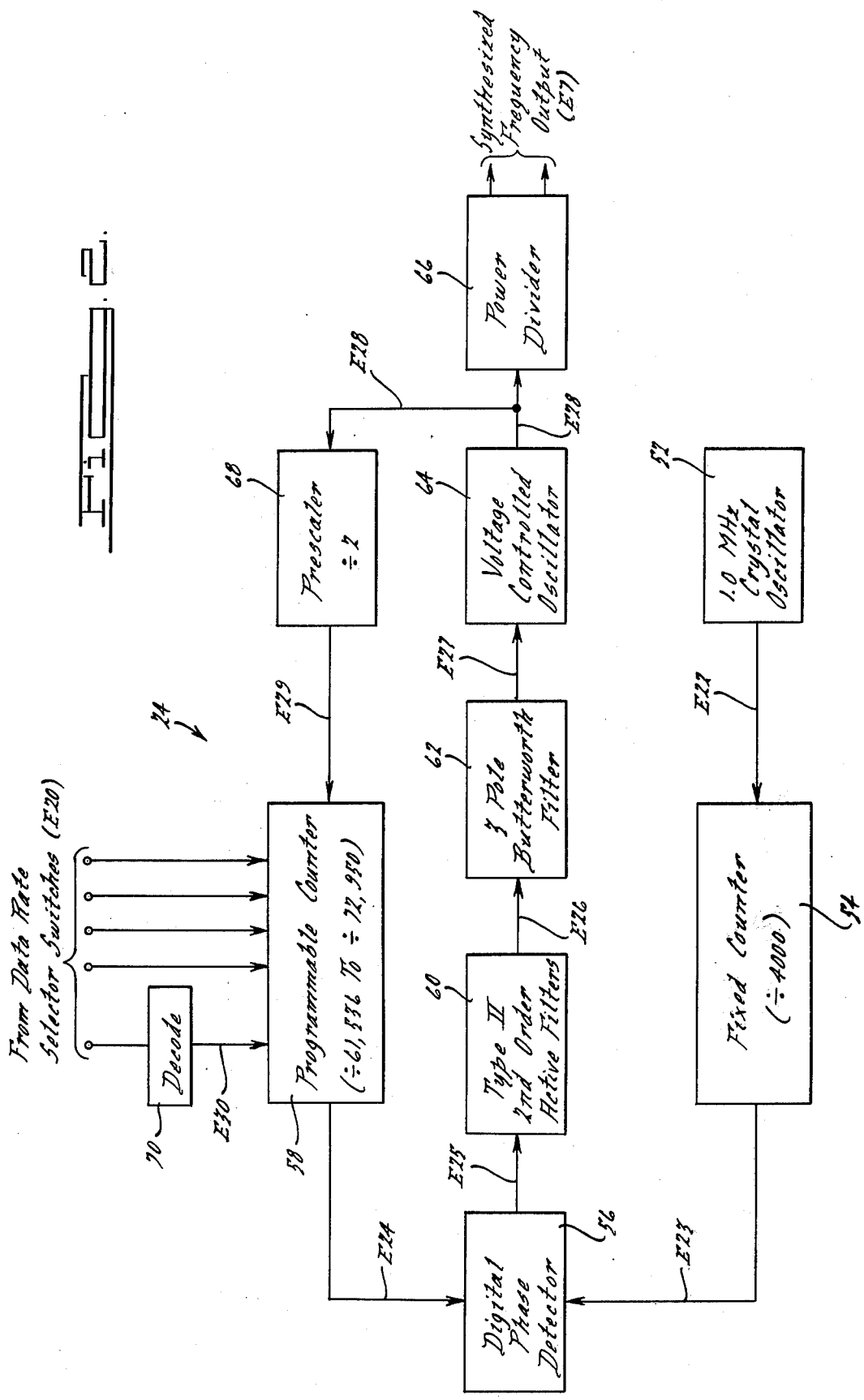
FIG. 2 is a block diagram of a frequency synthesizer utilized in the circuit of FIGS. 1 and shown in block form therein.

With particular reference now to FIG. 2, there is shown a block diagram of the frequency synthesizer 24 illustrated as a single block in FIG. 1. The frequency synthesizer has the function of producing an output signal having a frequency in the range from 30.768 MHz to 36.475 MHz in increments of 1,000 Hz, as previously described. The data rate selector 26 provides five binary-coded-decimal output signals, collectively designated as the electrical signal E20, that are supplied to a programmable counter 58. One of the binary-coded-decimal inputs of the signal E20 is applied to a decoder circuit 70 having an output electrical signal E30 that is supplied to the programmable counter 58.

Basically, the frequency synthesizer 24 comprises a phase-lock-loop configuration in which a fixed and a programmable counter are used to effect a phase comparison at a low frequency level (250 Hz) in order to achieve the desired synthesizer output frequency capable of incremental variations of a 500 Hz magnitude. The reference signal used in the phase comparison network is derived from a 1 MHz temperature-compensated crystal oscillator 52.

The output signal from the crystal oscillator 52 is an electrical signal E22 which is divided by 4,000 by a fixed counter 54. The electrical signal E23 at the output of the fixed counter therefore has a frequency of 250 Hz. This is applied to a digital phase detector 56, which also is supplied with the electrical signal output E24 from the programmable counter 58.

The output of the digital phase detector 56 is a voltage electrical signal E25 having a magnitude proportional to the difference in phase between the electrical signal E23 and E24. A type II second order active filter 60 filters the signal E25 to produce an electrical signal E26 that is once again filtered by a three-pole Butterworth filter 62 having an output electrical signal E27. Preferably, the type II filter 60 provides a second-order loop having a natural frequency selected in the present embodiment to be equal to the frequency of the phase detector sampling signal E23 divided by 100, or 2.5 Hz. Also, the Butterworth filter in the present embodiment is selected to have a cut-off frequency equal to the frequency of the signal E23 divided by 10, or, 25 Hz. This filter insures the absence of a 250 Hz component in the signal E27, but does not disturb the second-order loop since its natural frequency is an order of magnitude lower than the cut-off frequency of the Butterworth filter.

The electrical signal E27, proportional to phase difference in the signals E23 and E24, provides control of an electronically or voltage controlled oscillator 64. The output electrical signal E28 from the oscillator 64 varies from 30.768 Mhz to 36.475 MHz and is supplied by a prescaler 68 which performs a division by two of the frequency of the signal E28 to produce an electrical signal E29 having a frequency range from 15,384 MHz to 18.2375 MHz. This signal is applied as the input to the programmable counter 58.

The programmable counter 58 divides the frequency of the electrical signal E29 by a number in the range from 61,536 to 72,950 depending upon the setting of the data rate selector 26 dials or switches. Of course, the output frequency of the oscillator 64 is adjusted to maintain a frequency of 250 Hz in the electrical signal E24 at the output of the programmable counter 58. The output signal E28 is applied to a power divider circuit 66 from which the output electrical signal E7 is obtained for supply to the up-converter 14 and down-converter 20 in the clock-signal recovery circuit 10.

It should be noted that the programmable counter 58 in the frequency synthesizer 24 performs a division in the range from 61,536 to 72,950 and that the clock rate or data rate of the binary data signal E1 varies in frequency from 1.536 MHz to 12.950 MHz. These ranges differ from one another only in the most significant digit. The difference in the most significant digit is rectified by use of the decode circuit 70, which programs the most significant digit of the counter 58 division for a 6 or 7 when the most significant digit of the data rate selector 26 is a zero or 1, respectively. The remaining digits in the programmable counter division are as indicated by the data rate selector 26 switches.

With particular reference now to FIGS. 3–7, there are shown detailed schematic diagrams of the circuitry shown in block form in FIGS. 1 and 2. The circuit elements enclosed within broken lines are given numerical designations corresponding to the blocks in FIGS. 1 and 2. The logic transition detector 12 shown in FIG. 1 is not illustrated in schematic detail in FIGS. 3–7.

Figure 3:
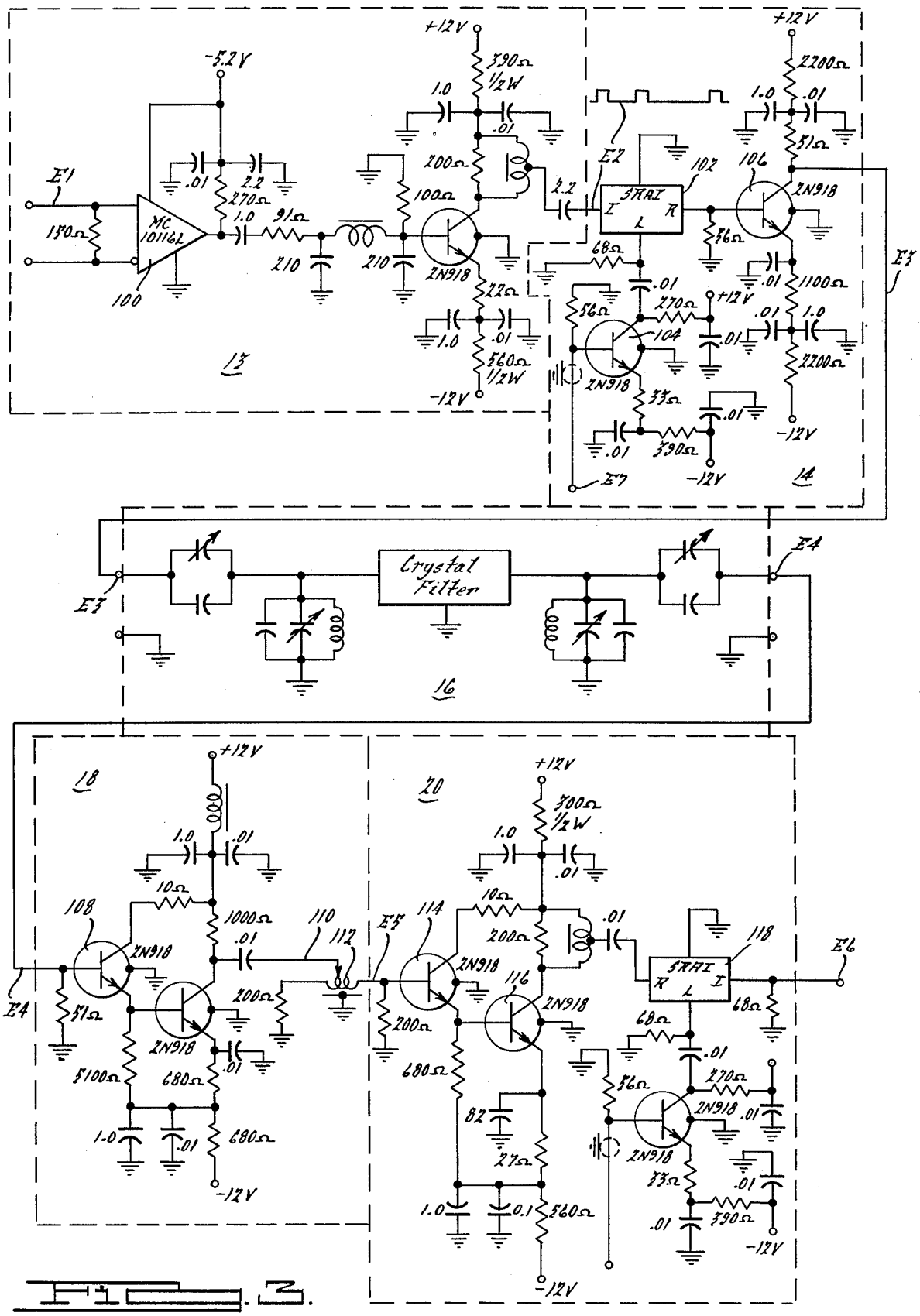
FIG. 3 is a detailed schematic electrical diagram of circuits 14, 16, 18 and 20 shown in block form in FIG. 1.

In FIG. 3, a circuit 13 is shown which may form a part of the output portion of the logic transition detector 12 or which may be regarded as being a part of the up-convertor 14. The circuit 13 is essentially an amplification and pulse shaping circuit that also performs an impedence matching or buffering function. The electrical signal E1 shown applied to the input of an amplifier 100 actually is not the same signal E1 applied as the binary-data-signal input to the logic transition detector 12, but is derived therefrom. The output signal E2 from the circuit 13 is comprised of a series of narrow pulses each of which corresponds to a transition in the logic level of the binary data input signal E1 to the logic transition detector 12.

Component 102 in the up-convertor 14 is a balanced mixer commercially available from Mini-Circuit Laboratories, Brooklyn, New York. The input to the mixer 102 at its terminal L is coupled to the collector of a transistor 104 whose base is supplied with the frequency synthesizer output electrical signal E7. The sum and difference frequencies produced by the mixer 102 are applied to base of a transistor 106 at the collector of which the electrical signal E3 appears.

The electrical signal E3 is applied to the narrow-band filter 16, which is a crystal filter at 30 MHz with a very narrow passband of 13 KHz and with very sharp upper and lower cut-off limits.

The filter output electrical signal E4 is applied to the base of a transistor 108 in the variable time delay network 18. The delay, of about 50 nanoseconds, provided by the circuit 18 is controlled by the movable arm 110 of a variable inductor 112. Generally, variation of the delay setting of the circuit 18 is not required after initial set-up of the digital data receiver in which the clock-signal recovery circuit is utilized.

The electrical signal E5 from the delay circuit 18 is applied to the base of a transistor 114 in the down-converter circuit 20. This transistor, together with a transistor 116 and their associated components, from the input circuitry coupling the signal E5 to the R-input of a balanced mixer 118 of the type described in connection with the up-converter circuit 14. The balanced mixer 118 down-converts the signal E5 to the signal E6 having a frequency at one-half the clock frequency corresponding to the data rate of the binary data signal E1. The electrical signal E6 is applied to the low-pass filter 22 shown in FIG. 4 to produce the reference electrical signal E14 having a frequency at one-half the clock rate of the binary data signal.

The signal E14 passes through the buffering circuit 42 to the digital phase detector 44, which includes a commercially available digital phase detector 120.

The output signal E16 from the phase detector 44 is applied to the input of an operational amplifier 122, which acts as an active filter and which provides a type II second-order loop-response characteristic to the phase detector signal E16. Following the second-order filter is a two-pole Butterworth low-pass filter formed by an operational amplifier 124 and its associated circuitry. The output electrical signal E17 from the amplifier 124 forms one input to the variable gain amplifier 47. The signal E17 is applied to the positive input of an operational amplifier 126 at the output of which the electrical signal E18 appears. The gain of the amplifier 126, connected in a feedback configuration, is controlled by the signal E19 and $\overline{E19}$, the latter signal being the complement of the former.

The electronically-controlled oscillator 28 is supplied with the electrical signal E18 to produce the oscillator output signal E8 at the output of a commercially available oscillator module 128. The oscillator output frequency is controlled by a voltage variable capacitance diode or varactor 130.

Figure 5:
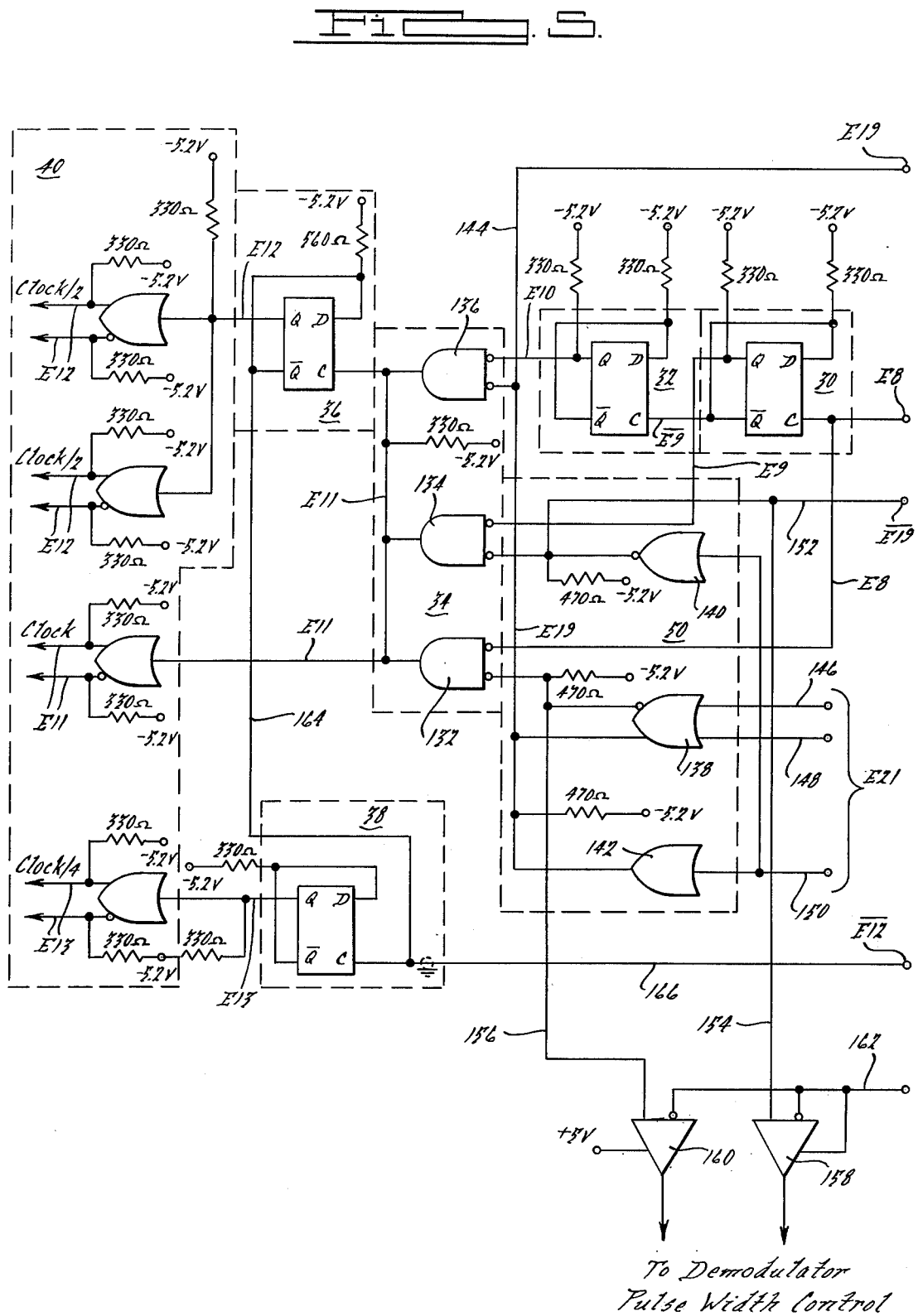
FIG. 5 is a detailed schematic electrical diagram of circuits 30, 32, 34, 36, 38, 40 and 50 shown in block form in FIG. 1.

In FIG. 5, it may be seen that the electrical signal E8 from the oscillator 28 is applied to the clock input C of a type-D flip-flop in the frequency divider network 30.

The Q-output of this flip-flop is the electrical signal E9 and the $\overline{Q}$-output is applied as the electrical signal $\overline{E9}$ to the clock input C of a type-D flip-flop in the frequency divider network 32. The electrical signal E10 appears at the Q-output of this flip-flop.

The signals E8, E9 and E10 are applied, respectively to inputs of gates 132, 134 and 136 in the digital switch 34. Gate 132 has an input connected to one output of a gate 138 in the rate decoder 50. Gate 134 has one of its inputs connected to the output of a gate 140 in the rate decoder, and gate 136 has an input coupled to outputs of the gate 138 and a gate 142 in the rate decoder via a lead 144 on which the electrical signal E10 appears. The input signal E21 to the gates 138 and 142 in the rate decoder 50 are supplied with the electrical signal E21 from the data rate selector 26. This electrical signal consists of three bits of binary data obtained from the binary-coded-decimal outputs of the data rate selector switches. Lead 146 receives the bit corresponding to the units position of the most significant digit of the binary-coded-decimal data rate selector output signal. On lead 148, the eight's position bit of the second most significant digit of the binary-coded-decimal output signal from the data rate selector 26 appears. On the lead 150, the four's bit of the second most significant digit appears. Thus, the output electrical signal E11 from the digital switch 34 is one of the signals E8, E9 or E10 depending upon the content of the bits applied to the leads 146, 148 and 150 in the rate decoder 50. The signal E19 on lead 144 and the signal $\overline{E19}$ appearing on a lead 152 are applied to the variable gain amplifier circuit 48 (FIG. 4) as previously described. This varies the gain of the amplifier 48 in accordance with the one of the three ranges of frequencies for the signal E11 determined by the digital switch 34 controlled by the rate decoder 50. The purpose of varying the gain of the amplifier 48 is to compensate for the variation in loop gain otherwise resulting from the use of different magnitudes of frequency division in the frequency divider networks 30 and 32.

Figure 4:
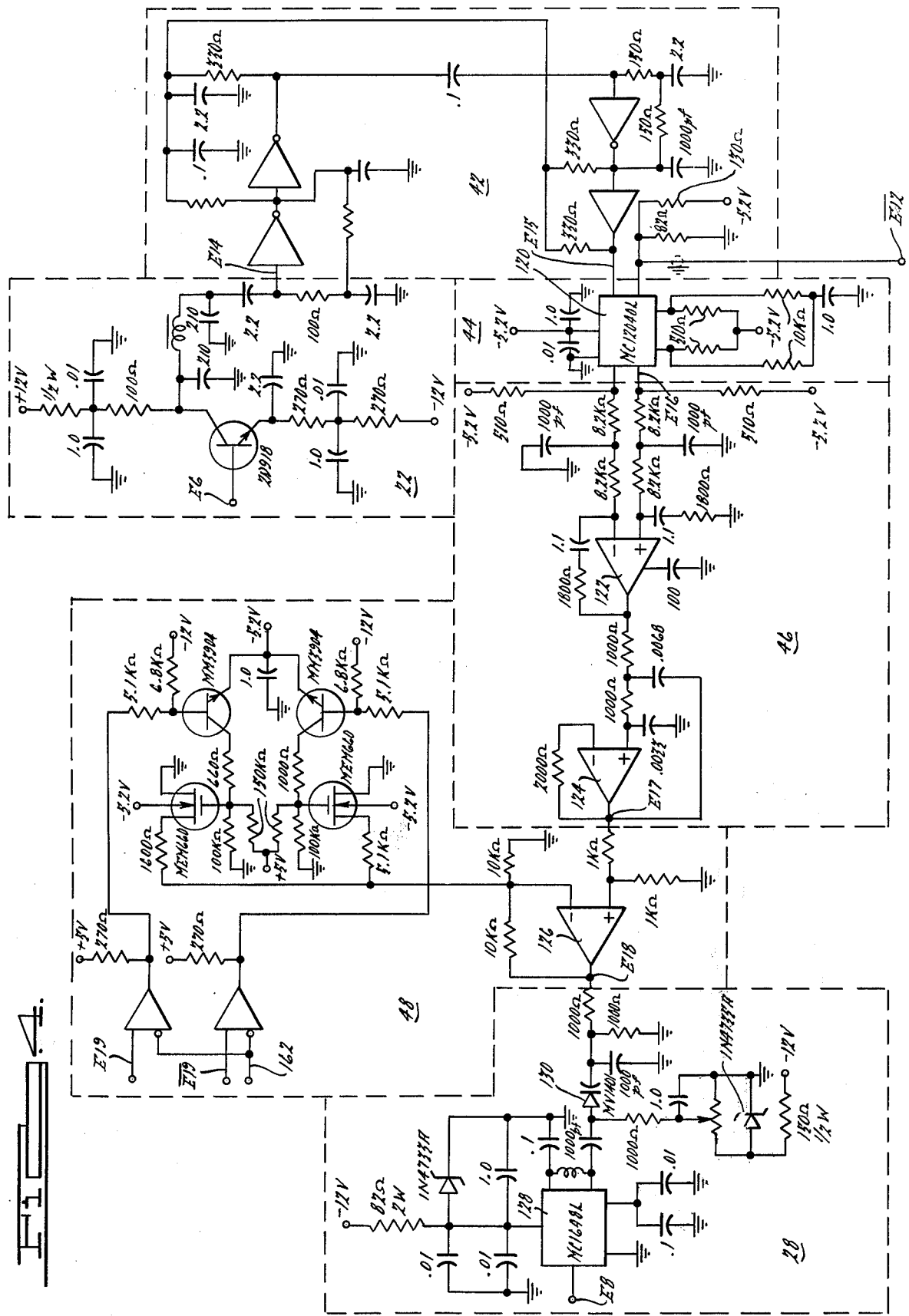

The signals appearing on leads 154 and 156 connected to amplifiers 158 and 160, respectively, may be utilized by a circuit in the demodulator portion of the digital data receiver to control the width of the pulses in the waveform E2 supplied to the up-convertor circuit 14. Lead 162, connected to the input sides of the amplifiers 158 and 160, is connected to the variable gain amplifier 48 as shown in FIG. 4.

The frequency divider networks 36 and 38 utilize type-D flip-flops as shown in FIG. 5. The electrical signal E12 appears at the $\overline{Q}$-output of the flip-flop in the divider network 36, and the $\overline{Q}$-output of this flip-flop is the complement of the signal E12, that is, $\overline{E12}$, and is supplied to the digital phase detector 44 and to the clock input of the flip-flop in the divider network 38 via leads 164 and 166.

The buffer circuit 40 comprises a plurality of gates coupled directly to the digital switch 34 and to the divider networks 36 and 38.

FIGS. 6 and 7 are detailed schematic diagrams of the frequency synthesizer circuit 24. As may be seen in FIG. 6, the programmable counter 58 comprises five identical decade counters 168, 170, 172, 174, and 176. Counters 168, 170, 172 and 174 are directly coupled to the binary-coded-decimal electrical signal E20 from the data rate selector 26. The input to the counter 168 is the least significant digit of the signal E20, the input to the counter 170 is the second least significant digit, etc. The decode circuit 70 controls the signal E30 applied to the counter 176 as the most significant digit, as was previously described.

The remainder of the circuitry is FIGS. 6 and 7 is not described in greater detail because the drawings are believed to be self-explanatory in view of the previous circuit description and because frequency synthesizers are commercially available. The frequency synthesizer 24 as illustrated and described herein, however, is the preferred apparatus.

Based upon the foregoing description of the invention, what is claimed is:

1. A variable-rate clock-signal recovery circuit for a digital data receiver, said digital data receiver including means for generating a binary data signal having a characteristic which changes in a manner corresponding to transitions in the digital data received by said receiver, said variable-rate clock-signal recovery circuit comprising:

first circuit means, supplied with said binary data signal, for generating a first electrical signal comprising a series of pulses, each of said pulses corresponding to a transition in the digital data received by said receiver;

second circuit means for generating a second electrical signal of predetermined or selectable frequency;

third circuit means, supplied with said first and second electrical signals, for mixing said first and second electrical signals and up-converting said first electrical signal to produce a third electrical signal having side-band or spectral components differing in frequency from said second electrical signal by the spectral content of said first electrical signal;

fourth circuit means, supplied with said third electrical signal, for producing a fourth electrical signal of predetermined frequency, said fourth circuit means filtering said third electrical signal;

fifth circuit means, supplied with said second electrical signal and with said fourth electrical signal or a signal derived therefrom for mixing or down-converting said fourth electrical signal or signal derived therefrom to produce a fifth electrical signal having a frequency corresponding to the difference in frequencies of said second and fourth electrical signals and proportional to the clock rate of said binary data signal.

2. A variable-rate clock-signal recovery circuit according to claim 1 wherein said second circuit means comprises a data rate selector and a frequency synthesizer, said frequency synthesizer generating said second electrical signal and said data rate selector controlling the frequency of said second electrical signal.

3. A variable-rate clock-signal recovery circuit according to claim 2 which further comprises an electronically-controlled oscillator for generating a sixth electrical signal of variable frequency; and a phase detector supplied with said fifth electrical signal or a signal derived therefrom and with a signal having a frequency proportional to the frequency of said sixth electrical signal produced by said electronically-controlled oscillator, said phase detector generating a seventh electrical signal having a characteristic governed by the magnitude of the phase difference between said signals supplied to said phase detector, said seventh electrical signal being supplied to said electronically-controlled oscillator to adjust the frequency of said sixth electrical signal to reduce said phase difference between said signals supplied to said phase detector, said sixth electrical signal thereby having a frequency proportional to the clock rate corresponding to the data rate of said binary data signal.

4. A variable rate clock signal recovery circuit according to claim 3 which further includes a variable gain amplifier interposed between said electronically-controlled oscillator and said phase detector for amplifying said seventh electrical signal supplied by said phase detector to said electronically-controlled oscillator.

5. A variable-rate clock-signal recovery circuit according to claim 4 wherein said variable gain amplifier is coupled to said data rate selector, the gain of said variable gain amplifier being controlled by said data rate selector.

6. A variable-rate clock-signal recovery circuit according to claim 4 which further includes a switch having a plurality of input terminals and an output terminal, said output terminal being selectively coupled to said input terminals, said input terminals being supplied with said sixth electrical signal and with at least an eighth electrical signal having a frequency equal to the frequency of said sixth electrical signal divided by a whole number.

7. A variable-rate clock-signal recovery circuit according to claim 5 which further includes a switch having a plurality of input terminals and an output terminal, said output terminal being selectively coupled to said input terminals, said input terminals being supplied with said sixth electrical signal and with at least an eighth electrical signal having a frequency equal to the frequency of said sixth electrical signal divided by a whole number.

8. A variable-rate clock-signal recovery circuit according to claim 6 wherein said switch is coupled to said data rate selector, said data rate selector controlling the connection of said switch output terminal to said switch input terminals.

9. A variable-rate clock-signal recovery circuit according to claim 7 wherein said switch is coupled to said data rate selector, said data rate selector controlling the connection of said switch output terminal to said switch input terminals.

10. A variable-rate clock-signal recovery circuit according to claim 9 wherein said signal said to be supplied to said phase detector and said to have a frequency proportional to the frequency of said sixth electrical signal, is derived from the signal appearing on said output terminal of said switch.

* * * * *

UNITED STATES PATENT OFFICE
CERTIFICATE OF CORRECTION

Patent No. 3,959,601             Dated May 25, 1976

Inventor(s) Benjamin Olevsky, et al

It is certified that error appears in the above-identified patent and that said Letters Patent are hereby corrected as shown below:

On the cover sheet item [73] should read;

Assignee: -- Aeronutronic Ford Corporation, Blue Bell, Pa.

Signed and Sealed this

Thirty-first Day of August 1976

[SEAL]

*Attest:*

RUTH C. MASON
*Attesting Officer*

C. MARSHALL DANN
*Commissioner of Patents and Trademarks*